United States Patent [19]
Joslyn et al.

[11] 3,964,713
[45] June 22, 1976

[54] REVERSIBLE SEAT LOCK

[75] Inventors: Gerald L. Joslyn, Auburn Heights, Mich.; George W. Bingley, Kankakae, Ill.

[73] Assignee: Massey-Ferguson Inc., Detroit, Mich.

[22] Filed: Jan. 16, 1975

[21] Appl. No.: 541,675

[52] U.S. Cl. ............................. 248/418; 296/65 R; 297/349
[51] Int. Cl.² ..................................... B60N 1/02
[58] Field of Search ............ 297/349, 240; 248/145, 248/282, 415, 418; 296/65 R

[56] References Cited
UNITED STATES PATENTS

| | | | |
|---|---|---|---|
| 2,845,990 | 8/1958 | Hubert | 297/349 X |
| 3,186,761 | 6/1965 | Propst | 297/349 |
| 3,542,424 | 11/1970 | Bingley | 297/349 |
| 3,822,852 | 7/1974 | Quakenbush | 297/349 |

Primary Examiner—Roy D. Frazier
Assistant Examiner—William E. Lyddane
Attorney, Agent, or Firm—Thomas P. Lewandowski

[57] ABSTRACT

A movable seat assembly which is supported relative to a vehicle by means of a support which permits the seat to be faced in opposite directions and in which the seat is pivotally mounted relative to the support to be disposed in selected positions of adjustment in either of its two facing directions and including a latch mechanism which securely locks the seat in either of its two facing directions or in its selected positions in a manner resisting loads placed on the seat and tending to cause pivotal movement of the seat or its support.

2 Claims, 5 Drawing Figures

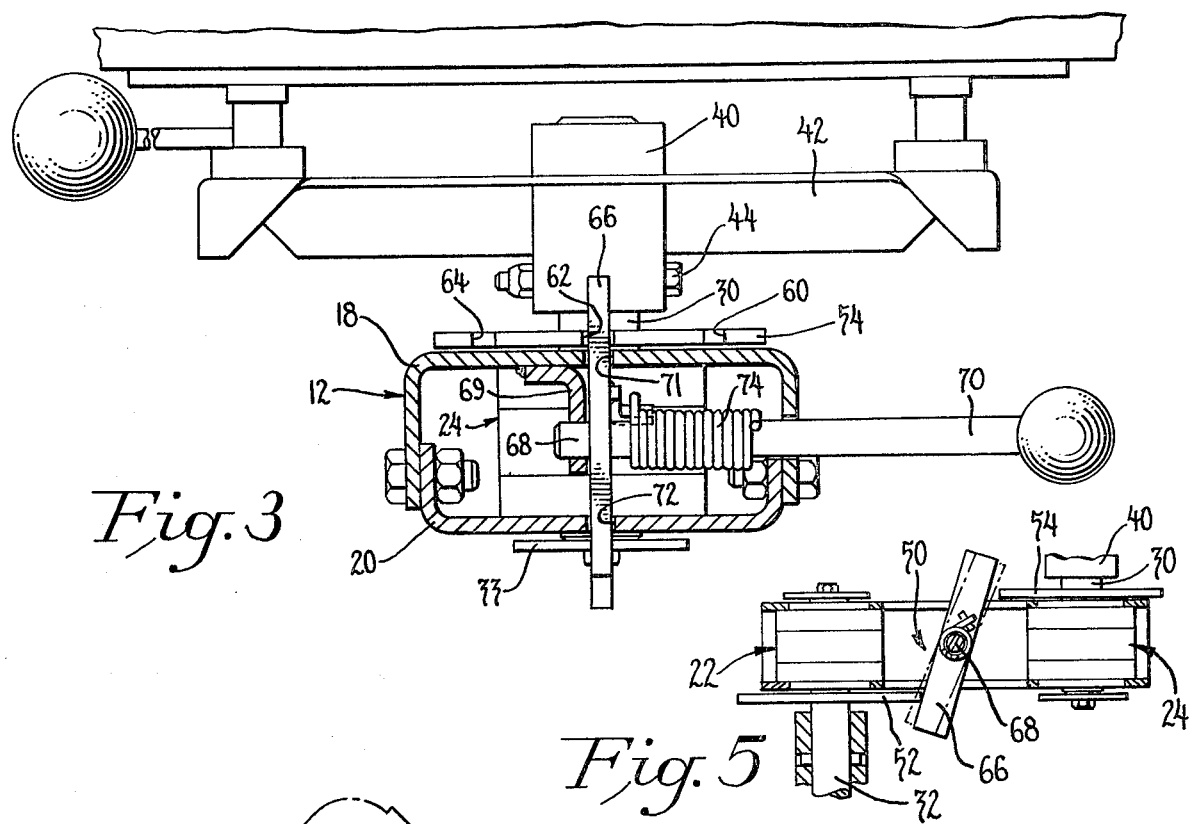
Fig. 3
Fig. 5
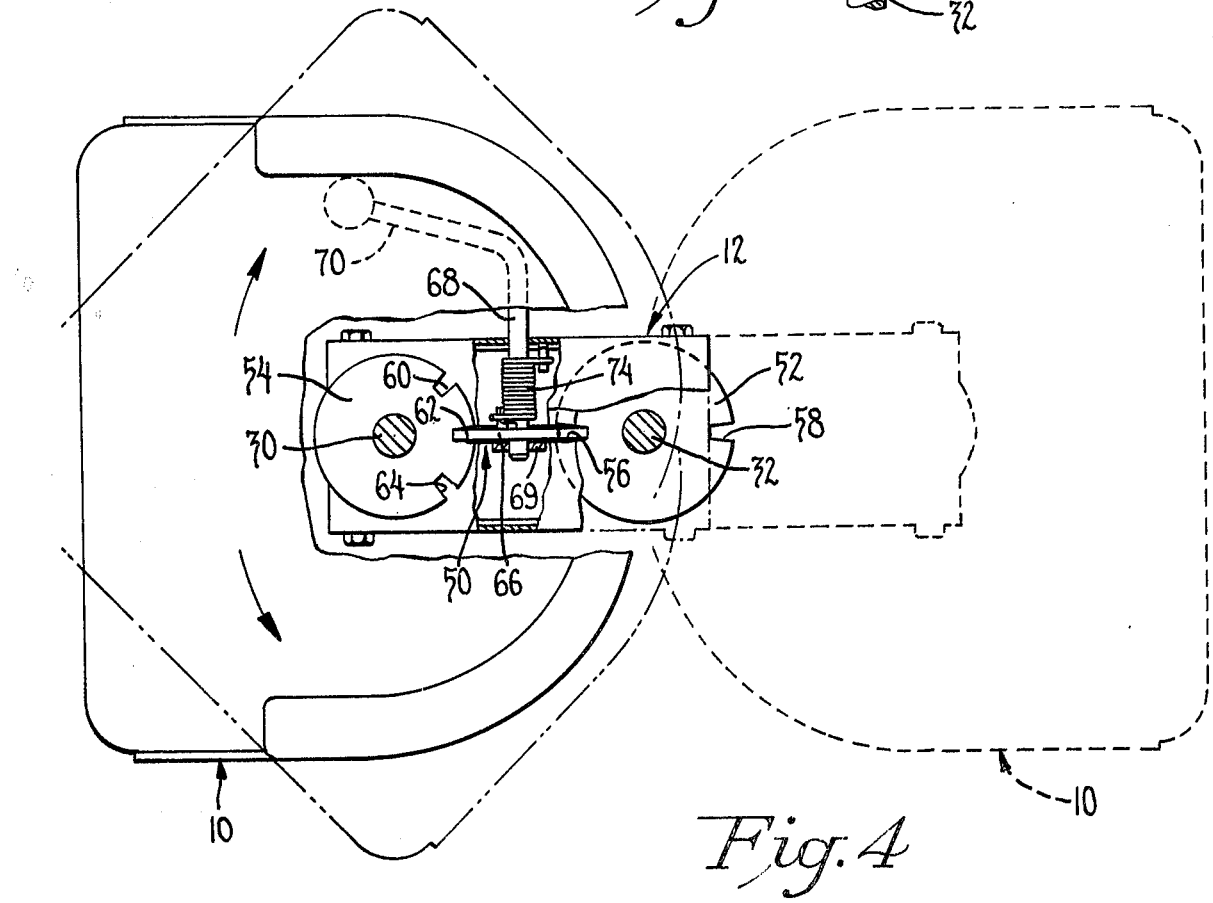
Fig. 4

REVERSIBLE SEAT LOCK

BACKGROUND OF THE INVENTION

This invention relates generally to seats and more particularly to a seat assembly which is movable to various positions of adjustment.

The invention is an improvement over the invention disclosed and claimed in U.S. Pat. No. 3,542,424 which is assigned to the Assignee of this application. The seating arrangement of the patent makes it possible for an operator of certain types of self-propelled vehicles such as a tractor with a rear mounted backhoe, for example, to change seating positions in order to properly drive the tractor and subsequently to operate the controls of backhoe. To properly control both the tractor and backhoe the operator must make frequent changes between various seating positions. In making these changes the body weight of the operator imposes large loads on the pivoting mechanism which tends to unlatch the seating arrangement from its selected position. This is an undesirable condition since the seat may inadvertently move to a position making it difficult for the operator to properly manipulate the various controls.

SUMMARY OF THE INVENTION

It is desirable to provide a movable seating arrangement in which the operator can select various positions and in which the seat will be securely and firmly retained in any of the selected positions independently of loads that may be imposed on the locking mechanism due to a transfer of the operator's body weight.

It is an object of the invention to provide an improved movable seating arrangement in which the seat may be moved to oppositely facing positions and in which the seat may be further adjusted to selected positions in each of its facing directions.

A movable seat assembly is provided in which a support is pivoted relative to a vehicle so that a seat mounted on said support can be swung to oppositely facing positions and in which the seat is further pivotally mounted relative to the support for movement to selected positions in either of its oppositely facing positions and in which the seat and support are firmly locked relative to each other and to the vehicle by a latch mechanism which resists loads and movement imposed on the seat and support due to the body weight and movements of the operator.

DESCRIPTION OF THE DRAWINGS

FIG. 3 is a sectional view taken generally on line 3—3 in FIG. 2;

FIG. 4 is a top plan view of the movable seat assembly in one of its latched conditions; and FIG. 5 is a view of a portion of FIG. 1 showing the latch mechanism in different latching positions.

DETAILED DESCRIPTION

Figure 1:
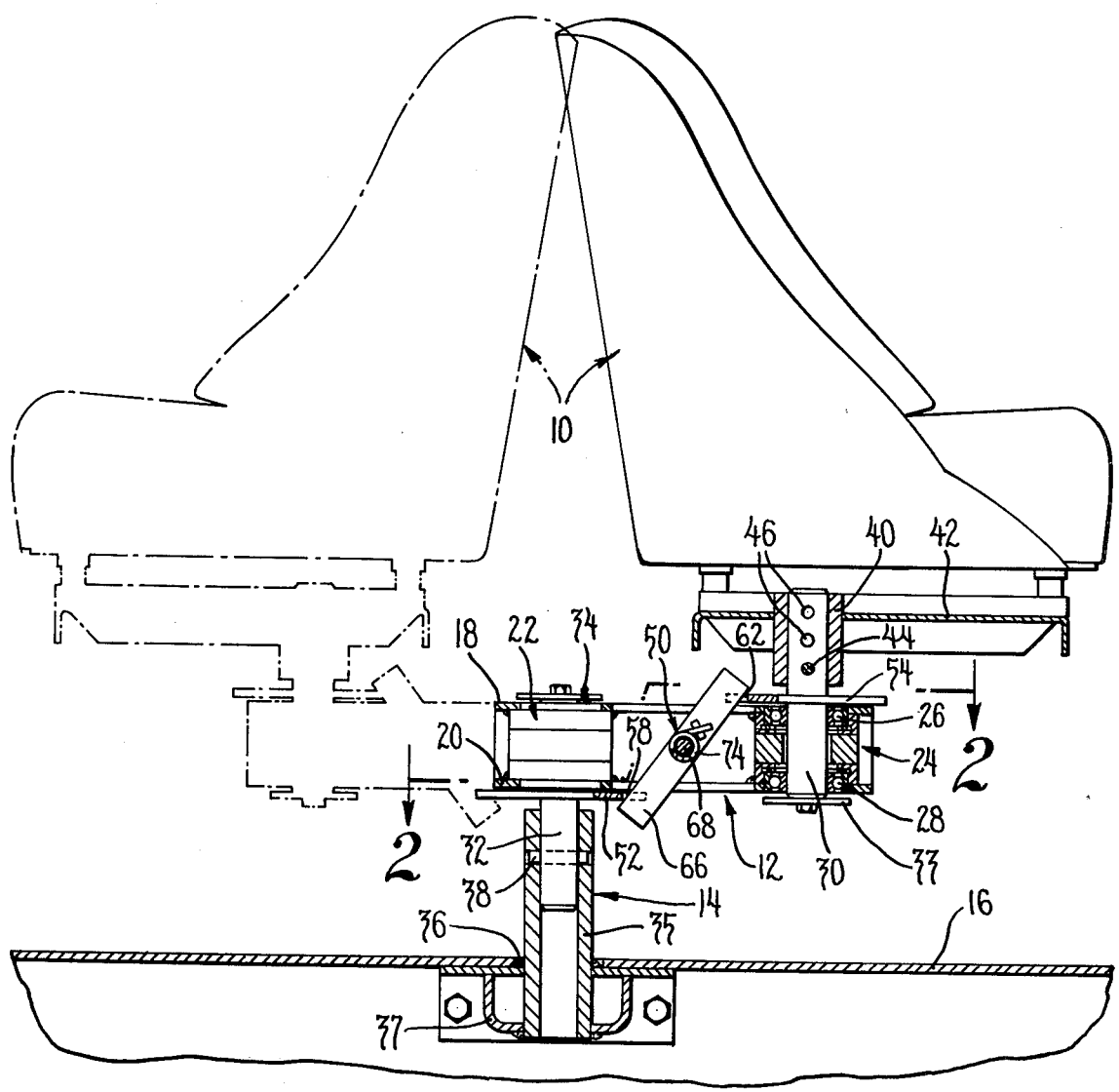
FIG. 1 is a side elevation of a movable seat assembly embodying the invention partially broken away and shown in section and illustrating two positions of the seat assembly.

Referring to the drawings and particularly to FIG. 1 a movable seat assembly embodying the invention includes a seat 10 which may be swivelled relative to one end of a support arm 12 which in turn has its opposite end swingable about a mounting post 14 secured to an operator's platform 16 of a vehicle not shown.

Figure 2:
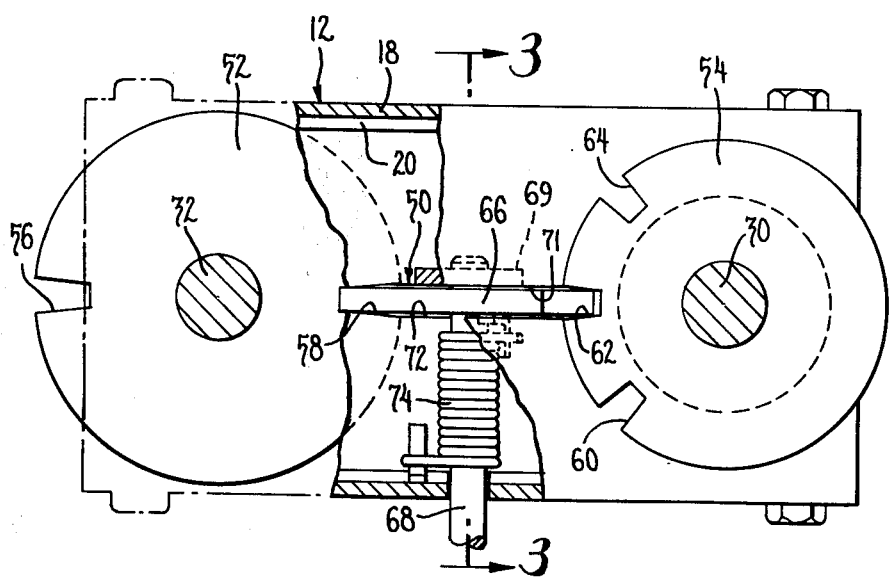
FIG. 2 is a sectional view at an enlarged scale taken generally along lines 2—2 in FIG. 1.

The support arm 12 as best seen in FIGS. 2 and 3 includes a pair of channel members 18 and 20 bolted together to form a rectangular box-like structure which is open at its opposite ends. As seen in FIG. 1, the support arm 12 is provided with a pair of identical bearing assemblies 22 and 24 at opposite ends of the arm. Referring to the bearing assembly 24, it includes a pair of bearing units 26 and 28 which are vertically spaced apart to journal a seat shaft 30. Similarly, the bearing assembly 22 includes a pair of spaced ball bearing units which rotatably receive a shaft 32 forming a part of the mounting post 14.

A stop plate 33 is bolted to the lower end of the shaft to prevent upward displacement of the shaft 30 from the bearing assembly 24. Similarly, the upper end of shaft 32 is provided with a stop plate 34 to limit vertical displacement of the arm 12.

The mounting post 14 includes a tubular member 35 which passes through an aperature 36 in the operator's platform 16 and is rigidly connected to a bracket 37 at the underside of the platform 16. The upper end of the tubular member 35 receives the lower portion of the shaft 32 and is secured to the tubular member by means of a radial extending locking pin 38.

Referring again to FIG. 1, the upper end of the shaft 30 receives a cylindrical collar 40 which mounts a support frame 42 for the seat 10. The collar 40 may be located vertically on the shaft 30 to selected vertical positions by means of a bolt 44 passing through the collar 40 and a selected one of three radial openings 46 in the shaft 30. The seat 10 can be rotated relative to the support arm 12 by means of the shaft 30 journaled in the bearing assembly 24. Similarly the arm 12 can be pivoted relative to the post 14 about the shaft 32 journaled in the bearing assembly 22. In this manner the seat 10 pivots relative to the support arm about a generally vertically disposed axis which is spaced from the vertical axis of the post 14 for the swinging support arm 12.

The seat 10 is held in selected positions relative to the support arm 12 and in turn, support arm 12 is held in selected positions relative to the post 14 by means of a latching mechanism 50. The latching mechanism includes a disc element 52 rigidly connected to one end of the shaft 32 and at the under side of the support arm 12. Another disc element 54 is rigidly connected to the shaft 30 in a position disposed above the support arm 12. The disc member 52 has a pair of diametrically opposed notches 56 and 58 formed in its circumferential edge and the disc element 54 has three spaced notches 60, 62 and 64 which are arcuately spaced apart approximately 45° from each other.

The latching mechanism 50 also includes a lock member 66 which is mounted relative to the support arm 12 to swing about a generally horizontal axis disposed transversely and intermediate the vertical axes of the shafts 30 and 32. The lock bar 66 is rigidly connected adjacent one end of a shaft portion 68 which is journaled to rotate in an outer wall of the box-like support arm 12 and an inner bracket 69. The shaft 68 is provided with a handle portion 70 by which an operator may swing the lock bar 66 between selected positions. As best seen in FIG. 3, the opposite ends of the lock bar are disposed for movement in a slot 71 in the channel member 18 and a slot 72 in the channel member 20. The ends of the lock bar protrude from within the support arm and through the slots for engagement with the various notches in the discs 52 and 54 which are disposed in close, adjacent relation to the slots 71 and 72. During swinging movement, the upper end of the lock bar 66 moves freely in the slot 71 formed in the channel member 18 and the lower end moves freely in the slot 72.

As best seen in FIG. 1, the lock bar 66 is disposed in its locked position in which the lock bar 66 is disposed in mating engagement with the notch 58 on the disc element 52 and with the notch 62 in the disc element 54. The lock bar 66 is held in this engaging condition by means of a coiled spring 74 acting between the shaft 68 and the support arm 12 so that the lock bar 66 is continuously urged in a clockwise direction as viewed in FIG. 1.

In the solid line position of the seat 10 shown in FIG. 4 the lock bar 66 is fully engaged in the notch 56 of disc element 52 and in the notch 62 of disc element 54. As a result, the seat 10 and disc 54 is locked against rotational movement relative to the support arm 12. In addition, the support arm 12 is locked relative to the disc 52 which is stationary with the shaft 32. In this manner the seat 10 is held firmly against movement relative to the operator's platform 16.

To move the seat 10 from the solid line position of FIG. 1 to an oppositely facing position of the seat as shown in phantom lines, the handle 70 is used by an operator to rotate the lock bar 66 in a counter clockwise direction so that the lock bar 66 becomes disengaged from the notches 58 and 62 in the disc elements 52 and 54, respectively. Such movement of the lever 70 serves to free the seat 10 for pivotal movement relative to the support arm 12 and also to free the support arm 12 so that it may be pivoted relative to its supporting post 14. After the lock bar 66 is disengaged from the notches in the disc element 52 and 54, the operator may rotate the seat 10 relative to the support arm 12 and also swing the support arm 12 relative to the post 14. Release of the handle 70 after movement of the seat 10 and arm 12 begins causes the spring 74 to return the lock bar 66 in a clockwise direction so that its lower end engages the outer circumferential surface of the disc element 52 as seen in FIG. 5. The opposite or upper end of the lock bar will be spaced slightly from the disc 54. During swinging movement of the support arm 12 relative to the post 14, the lock bar 66 remains in engagement with the surface of disc 52 until the lock bar comes into position to be urged into the diametrically opposite notch 56. The now displaced seat 10 will be facing in the opposite direction as illustrated in the phantom lines in FIGS. 1 and 4 and may be further oriented by engaging the lock bar 66 into a selected one of the notches 60, 62 or 64 in the disc element 54.

With the seat 10 disposed in either of its oppositely facing directions illustrated in FIGS. 1 and 4 it may be desirable to angularly reposition the seat 10 relative to the support arm 12. In that case the lock bar 66 is rotated from the locked condition shown in FIG. 1 to the position illustrated in phantom lines in FIG. 5 so that the lock bar 66 remains partially engaged with the notch 56 or 58 but is disengaged from the notches 60, 62 and 64. In this condition, the seat 10 is free to pivot relative to the support arm 12 but the support arm 12 remains locked against swinging movement relative to the post 14. After the seat is moved to a position in which the lock bar is aligned with a selected one of the notches 60, 62 or 64, the lock bar enters the selected notch and the seat 10 is prevented from moving relative to the arm 12.

Latching or unlatching of disc element 54 without similar action with respect to disc element 52 can be accomplished by partial movement of the handle 70 and lock bar 66, but preferably disc element 52 is larger in diameter than disc element 54 to permit disc element 52 to be engaged even when the disc element 54 is unengaged and to be engaged first. Also, disc element 54 could be a partial rather than a full circle with any number of convenient notches.

A movable seat assembly has been provided in which a seat may be concurrently pivoted relative to a support and the support may be displaced to dispose the seat in selected ones of oppositely facing positions and also permit pivotal movement in either of the selected oppositely facing positions. Such movement and locking of the seat in its selected position is made possible by a latching mechanism which is movable between a first position latching both the seat and the support against movement, a second position latching only the support and freeing the seat for pivotal movement or a third position freeing both the seat and the support. In all of its latched positions the latching mechanism resists accidental unlatching due to loads imposed on the seat by an occupant.

The embodiments of the invention in which an exclusive property or privilege is claimed are defined as follows:

1. A movable seat for a vehicle comprising a horizontally disposed support, means mounting said support on said vehicle for pivotal movement about a first vertical axis, a seat, means mounting said seat on said support for pivotal movement about a second vertical axis, a first disc element mounted in a stationary position relative to said first axis, a second disc element mounted on said seat for movement with the latter about said second axis, a lock member mounted on said support for swinging movement about a horizontal axis between a first position engaging said first and second disc elements to prevent pivotal movement of said support relative to said vehicle and said seat relative to said support and a second position in which said support and said seat are free to pivot relative to each other and to said vehicle about said first and second axes, said first and second disc elements disposed at opposite upper and lower sides of said support, said lock member confined to the space between the first and second vertical axes.

2. The combination of claim 1 in which said lock member extends substantially equally in opposite directions from said horizontal axis for simultaneous engagement with said disc elements when said lock member is in said first position.

* * * * *